United States Patent Office 3,585,046
Patented June 15, 1971

3,585,046
METHOD FOR PREPARING DANISH PASTRY
John F. Schaible, Easton, Pa., and Simon S. Jackel, Westport, Conn., assignors to Baker Research Development Service, Inc., New York, N.Y.
No Drawing. Filed Mar. 27, 1968, Ser. No. 716,298
Int. Cl. A21d *13/08*
U.S. Cl. 99—92        11 Claims

ABSTRACT OF THE DISCLOSURE

A plurality of discrete, hard, particles comprising shortening having a melting point of not greater than about 108° F. and having a particle size of not greater than about 500 mm.³ such that one pound of said shortening comprises at least about 1000 particles, is incorporated in developed, leavened, Danish pastry dough and distributed therethrough. The dough can then be directly processed into Danish pastry, without the necessity of performing any roll-and-fold steps.

---

This invention relates to Danish pastry. More particularly, the invention relates to a rapid and effective method of making Danish pastry. Still more particularly, the invention relates to a method of making Danish pastry without the necessity of performing any of the tedious rolling and folding operations conventionally utilized in making Danish pastry.

Danish pastry is a sweet leavened dough product consisting of many layers of high quality leavened dough separated during the baking process by films of shortening. Although the ingredients used in making Danish pastry are very important, the principal characteristics of the baked product are a result of processing which provides alternating layers of shortening (pastry butter) and dough. The chief characteristics of Danish are due to the layering of the dough and it is thus readily apparent that the pastry butter should not be absorbed into the dough. If the pastry butter does permeate into the dough, shortening of the dough occurs and the Danish effect is destroyed. For this reason, the pastry butter employed must be selected with some care. In the early part of this century, Danish butter was reputed to be of the best quality for this purpose because it was extra plastic and waxy. Today, however, there are many margarines and fats available in the United States having properties generally regarded as appropriate.

The principal ingredients of typical Danish pastry are as follows:

(1) Rich, light, moist type Danish:
   Flour—100% bread type (gluten content 10–12%)
   Roll-in-fat—25% of the weight of the dough (2) Medium flake Danish:
   Flour—75% bread flour, 25% pastry flour (gluten content 7–8%)
   Roll-in-fat—30% of the weight of the dough (3) Full flake Danish:
   Flour—66⅔% bread flour, 33⅓% pastry flour
   Roll-in-fat—33⅓% of the weight of the dough A fairly representative overall formula in the United States is as follows:

| Ingredient: | Amount |
|---|---|
| Flour | 100 parts by weight (p.b.w.). |
| Sugar | 15–20 p.b.w. |
| Fat | 15–20 p.b.w. (including 20% of fat content of a mono type softener). |
| Salt | 1½–2 p.b.w. |
| Milk solids | 5 p.b.w. |
| Eggs | 13–20 p.b.w. whole eggs or 8–10 p.b.w. egg yolks. |
| Yeast | 4–6 p.b.w. |
| Flavoring to suit | Typically ½ to 1 p.b.w. vanilla, nutmeg, lemon, butter flavor, cardaman etc. |
| Water | 45–55 p.b.w. |
| Roll-in-fat | 15–33⅓% based on the dough weight. |

Danish pastry according to the foregoing formulation is made as follows:

The dough is mixed at either low speed for relatively short duration to form a dough with very little development, or at higher speeds beyond cleanup for highly developed Danish. The dough is then permitted to ferment at room temperature for about one hour. The dough is then scaled into convenient size pieces (12–15 pounds) and shaped to fit trays. Trays loaded with the dough are then placed in a refrigerator at a temperature of about 34–35° F. for at least one hour to permit the dough to relax. The chilled dough is then rolled out into a sheet and pastry butter applied to two thirds of one side of the sheet. One third of the sheet (with no shortening) is then folded over the center third of the sheet and the remaining third is folded on top. In this manner, three layers of dough and two of fat are formed. This is called a three-fold roll and is the most customary roll-in procedure in Danish pastry making although four-fold and two-fold rolls are sometimes used. The folded dough is then returned to the retarder for at least an hour. The dough is then rolled into a sheet and again folded, but without the use of pastry butter. If a three fold roll-in is employed on this second roll-in, two dough surfaces come into direct contact to form a single dough layer during the first fold. The net result of two three-fold rolls, therefore, is 7 layers of dough and six layers of fat. At least two more chilling, sheeting and rolling procedures are necessary to produce good Danish. After four three-fold rolls, a product of 109 layers (55 dough, 54 fat) will be formed. Some Danish pastries are known, however, to have as many as 300 and more layers.

Where a plurality of the same type (e.g. three-fold rolls) of folds are employed, the number of layers of the Danish product can be calculated as follows:

Layers of fat $=(X-1)\cdot(X)^{n-1}$
Layers of dough $=1+(X-1)\cdot(x)^{n-1}$
Total $=1+2\cdot(X-1)\cdot(X)^{n-1}$ wherein X represents the number of folds in a given roll, and $n$ represents the number of times that the dough is rolled and folded.

As an example, for a three-fold roll performed four times, the total number of layers would be equal to:

$$1+2\cdot(3-1)\cdot(3)^3=1+108=109$$

It is readily apparent from the above, that the production of Danish pastry is a detailed and costly process requiring a great deal of hand labor and time.

In our copending U.S. application Ser. No. 373,534, now Pat. No. 3,388,997, we have described a rapid and efficient method of making Danish pastry of excellent quality. As is fully disclosed in that specification, Danish pastry is made by incorporating discrete particles of pastry butter in developed, leavened, Danish pastry dough to provide a dough which can be made into excellent Danish with as few as one roll and fold step and without the necessity of using roll-in fat. In accordance with our earlier invention, it was considered necessary to roll and fold the dough at least once to produce the flaky characteristics and mouthfeel of Danish pastry. This was considered to be particularly true where it was desired to make Danish comparable to conventional Danish made with three or more conventional roll and fold steps.

It is an object of the present invention to provide a method of making Danish pastry in a rapid and efficient manner. It is a further object of the invention to provide a method of making Danish pastry without the necessity of performing any roll and fold step.

These and other objects which will become apparent in light of the present specification are achieved according to the present invention by distributing throughout a developed, leavened, Danish pastry dough, a plurality of discrete particles comprising shortening having a melting point not greater than about 108° F., said particles having a size of not greater than about 500 mm.$^3$ such that one pound of said particles comprises at least about 1000 particles. This dough can be directly made into Danish pastry without the necessity of performing any roll and fold step. After fermentation, the dough can be made up, proofed, and baked to form a tender, flaky pastry which is comparable to conventional Danish.

It has been discovered that, in order to be able to produce Danish pastry having the flaky characteristics of true Danish without the necessity of performing any roll and fold operation, the characteristics of the shortening particles distributed throughout the dough are critical. In our earlier application, we found that the use, in general, of small particles of shortening reduced the number of roll and fold steps required to produce flaky Danish pastry. We have now discovered, however, that by selecting certain small particles of shortening, the roll and fold process can be eliminated altogether. According to the invention, to avoid the necessity of performing any roll and fold step, the shortening particles should have a certain maximum size and the shortening should have a maximum melting point.

The size of the particles should be not greater than about 500 mm.$^3$ such that one pound of shortening (average density about 0.91) comprises at least about 1000 particles. The particles can be as small as desired. However, due to the inherent consistency of shortening, it is not practical to make ultra fine particles nor is it required to make ultra fine particles to obtain the beneficial results of the present invention. Furthermore, it is desired that the particles maintain their discrete nature in the dough. Accordingly, a practical lower limit on particle size is about 0.1 mm.$^3$ or 500,000 particles per pound. Where particles in the form of flakes are utilized, it is more feasible to use particles having a larger volume than where more bulky particle forms are used. Where the particles are not flakes, it is preferable that the particle volume is not greater than about 250 mm.$^3$ or about 2000 per pound, and still more preferably not greater than about 100 mm.$^3$ or about 5000 per pound.

As will be mentioned more fully hereinafter, the shortening should have a melting point of not greater than 108° F. (Melting points given herein are determined by the capillary tube method cc. 1–25 of the American Oil Chemist's Society.) However, the shortening should be firm when distributed in the dough to prevent shortening action. The particles may be refrigerated to provide the desired hardening. Alternatively, however, the particles may be encapsulated in, or blended with, various materials including hard fats, including hard fats having melting points above 108° F. In that even, however, the particle will comprise at least about 75% by weight, and more preferably at least 90%, of the shortening having a low melting point according to the invention, the balance of the particle being the encapsulating or blending material. In any event, the particles which may include up to 25% by weight of a hardening material blended or forming encapsulation therewith, should have the size mentioned.

The volume of a given particle according to the invention will depend on the density of the shortening and where a blending or encapsulating material is used, on the density of the particle. In general however, the volume of the particles will be from about 500 mm.$^3$ per particle (corresponding to about 1000 particles per pound, sp.g. 0.91) to about 1.00 mm.$^3$ per particle (corresponding to about 500,000 particles per pound, sp.g. 0.91).

The invention is illustrated in several of the examples which follow hereinafter and which include a preferred mode of carrying out the invention.

EXAMPLES 1–3

A Danish pastry dough is prepared from the formulation set forth in Table I.

TABLE I

| Ingredient | Pounds-ounces | Percent [1] |
|---|---|---|
| Flour (bread type) | 400 | 100 |
| Water | 187 | 46.8 |
| Yeast | 27 | 6.75 |
| Yeast food (Tola Do) | 8 | 2 |
| Sugar (granulated) | 66–10 | 16.7 |
| Salt | 5–13 | 1.45 |
| Powdered milk (NFDM) | 13–5 | 3.33 |
| Whole eggs | 50 | 12.5 |
| Liquid shortening | 43–5 | 10.8 |
| Softener (Atmul 500; lard monoglyceride) | 1–10 | 0.41 |
| Mold inhibiter (calcium propionate; Mycoban) | 0–8 | 0.125 |
| Dough conditioner (calcium stearyl-2-lactylate; Verv) | 1 | 0.25 |
| Gluten developer (proteolytic enzymes of fungal origin; Fermex) | 4 | 1.00 |

[1] Based on flour.

The dough ingredients are mixed in a one thousand pound capacity horizontal mixer for one minute at low speed and two and one-half minutes at high speed to develop the dough. One hundred pounds of shortening particles are then added to two hundred pounds of dough and the shortening particles are distributed throughout the dough by mixing for one and one-half minutes at low speed. The particles added are refrigerated at a temperature of about 0° F. before being incorporated in the dough, and the dough temperature is thus lowered by about 6–8° F. The dough is then allowed to ferment for 1½ hours. The fermented dough is then cut into a size suitable for handling at the sweet goods table and retarded at 35° F. for 30 to 45 minutes. The dough is then treated by conventional make-up, proofing, and baking procedures used with conventional Danish pastry. In these examples, a total of two pounds, ten ounces of spice mix and one pound, ten ounces of both lemon flavor and butter flavor is added to the two hundred pounds of dough that is processed.

The nature of the shortening particles added, and the results of each of the foregoing examples, is set forth in Table II.

TABLE II

| Example No. | 1 | 2 | 3 |
|---|---|---|---|
| Shortening | Palm kernel oil | Palm kernel oil | Hydrogenated cottonseed oil. |
| Melting point | 102° F | 102° F | 115° F. |
| Number of particles per pound | 12,000 | 500 | 12,000. |
| Layering | Excellent | Poor | Satisfactory. |
| Mouthfeel | do | Satisfactory | Poor. |

EXAMPLES 4–12

In order to determine the effect of shortening melting point on mouthfeel and waxiness, nine separate Danish pastry items are prepared from the same dough in an identical manner except for the melting point of the roll-in shortening. On the first day, the doughs are made and the fat is rolled in and the dough retarded overnight. On the second day, two sample rings are made up and baked from each dough. The baked rings are tasted after being stored for one day in polyethylene bags to simulate the normal time lag between baking and consumption by a purchaser. The results of the taste test are set forth in Table III.

TABLE III

| Ex. No. | Shortening | Melting point (° F.) | Observations of five tasters |
|---|---|---|---|
| 4 | Palm kernel oil | 99 | All agree that there is excellent mouthfeel, good and light flavor, and no trace of waxiness. |
| 5 | | 102 | |
| 6 | | 104 | |
| 7 | | 106 | |
| 8 | Palm kernel oil | 108 | Three of five detected a trace of waxiness. |
| 9 | Cottonseed oil | 110 | All agreed there is a trace of waxiness. |
| 10 | do | 115 | All agreed definite waxiness and heavy. |
| 11 | Cottonseed oil | 120 | All agreed very waxy and very heavy. |
| 12 | | 130 | |

EXAMPLES 13–16

Spherical particles of anhydrous oleomargarine having a melting point of about 98° F. are encapsulated in fully hydrogenated cottonseed oil M.P. 144° F. by the method disclosed in U.S. Pat. No. 3,240,607. The amount of oleomargarine in the particles is as shown below. Danish pastry is prepared by a method similar to that set forth in connection with Examples 1–3.

| Example No. | 13 | 14 | 15 | 16 |
|---|---|---|---|---|
| Particle size (mm. diameter) | 3.36 | 3.36 | 2.83 | 2.83 |
| Amount of hard fat, percent | 10 | 10 | 40 | 40 |
| Pellets refrigerated | No | Yes | No | Yes |
| Results | (1) | (1) | (2) | (2) |

[1] Flaky and tender; no waxiness.
[2] Poor flakiness, waxy, tough.

EXAMPLE 17

Danish pastry having excellent mouthfeel and flakiness is prepared as in Example 1 except that the palm kernel oil particles have a size of 120,000 particles per pound.

In addition to incorporating particles of shortening into the Danish pastry, it is also possible to incorporate flavoring and/or coloring materials in much the same way. That is, particles of flavoring material could be distributed throughout the dough. In that event, it is preferred to incorporate such flavoring particles prior to incorporation of the shortening particles to reduce the likelihood of smearing out the fat particles into the dough. Under present practice, fillings such as jelly and cinnamon are applied to the rolled out dough which is then curled to provide three or four curls. This can be eliminated in the present invention by adding the filling to the mixer in the form of discrete particles. This principle can be used to provide various coloring and/or flavoring effects by simply incorporating several different flavoring and coloring materials.

Since large particles reduce the flaky character of the product, it is preferred that all of the particles are smaller than the stated maximum which is 500 mm.³. However, provided that the majority, or 51%, of the particles has a volume of less than 500 mm.³ the balance of the particles may have a larger size. It is preferred, however, that the amount of particles having a volume of more than 1.00 cm.³ be kept to a maximum of 10% of the total weight of particles, and that particles larger than 2.00 cm.³ be excluded altogether. It is therefore contemplated that up to 39% by weight of the particles may have a particle size of from 0.500 cm.³ to 1.00 cm.³, and up to 10% by weight may have a particle size of 1.00 to 2.00 cm.³. In other words, the particle size distribution is preferably as follows:

| Volume (cm.³): | Percent by weight |
|---|---|
| $X < 0.500$ | 51–100 |
| $0.500 < X < 1.00$ | 0–39 |
| $1.00 < X < 2.00$ | 0–10 |
| $2.00 < X$ | 0 |

As mentioned above, where the particles do not have a flake configuration, larger particle sizes are less tolerable. Where the particles are not flakes, it is preferred that a majority (51%) of the particles have a volume of not more than 250 mm.³ and still more preferably not more than 100 mm.³. The preferred particle size distribution for non-flake particles is as follows:

| Preferred | | More preferred | |
|---|---|---|---|
| Volume (cm.³) | Percent by weight | Volume (cm.³) | Percent by weight |
| $X < 0.250$ | 51–100 | $X < 0.100$ | 51–100 |
| $0.250 < X < 0.500$ | 0–39 | $0.100 < X < 0.500$ | 0–39 |
| $0.500 < X < 1.00$ | 0–10 | $0.500 < X < 1.00$ | 0–10 |
| $1.00 < X$ | 0 | $1.00 < X$ | 0 |

The geometry of the particles can vary widely. The particles may be regular or irregular and the geometry of a given batch of particles may be similar or mixed. For example, the particles may be regularly spherical, rectilinear, cylindrical and the like or they may be irregular and, in either event, regular particles, as well as irregular particles, of the same or differing types and dimensions may be mixed with one another. It is preferred, however, to employ particles in the form of flakes. By "flakes" is meant a wafer like, generally planar particle having a maximum thickness of about 3 mm. and a length and width each at least 4 times the thickness. The maximum length and width of the flakes is limited only by the nature of the shortening and the limiting volume factor of 500 mm.³ per paricle. In general, however, neither width nor length will be greater than about 50 times thickness and length will generally be no greater than 20 times width.

The melting point of the shortening is also quite important. It is preferred that the shortening has a melting point of less than 108° F. For the greatest elimination of waxiness in mouth feel, it is preferred to use shortening having a melting point of less than 105° F. However, since the shortening is to be retained as discrete particles before baking, it is preferred to use shortening which is not liquid at dough temperatures. It is thus preferred to use shortening having a melting point of at least 90° F., and preferably at least 100° F. Butter, margarine and hydrogenated vegetable oils are suitable. Certain fats, such as palm kernel oil and cocoa butter, are particularly advantageous in that they are available with sufficient firmness without refrigeration and thus retain their particulate nature and resist being smeared out when they are distributed throughout the dough. Shortening having a lower melting point, and shortening which is plastic at processing temperature, such as butter, margarine, and common vegetable shortening, is refrigerated or otherwise treated to prevent smearing out. The particles may be stiffened by blending the shortening with a harder fat such as hydrogenated cottonseed oil having a melting point of 120° F. and more. Alternatively, or in addition, the particles may be encapsulated with gelatin or other materials as disclosed in our earlier application. Where encapsulation is utilized, it is preferred to encapsulate a soft fat with a harder fat. This can be conveniently effected by the methods disclosed in U.S. Pats. No. 3,240,607, No. 3,015,128, No. 2,766,478, and No. 3,293,695.

In any event, where the low melting point shortening is modified by blending or encapsulation with a hard fat having a melting point of over 108° F., or a non-shortening material such as gelatin, gum arabic and the like, it is preferred that the total amount of the modifying material is not more than 25% by weight of the particle, and still more preferably not more than 10%, particularly where the modifying material is a hard fat having a melting point of 120° F. or more.

The most preferred shortenings are those having the required low melting point and which are sufficiently firm to avoid smearing out at ordinary dough processing temperatures without the necessity of refrigerating, encapsulation or blending with modifiers. These preferred shortenings have been found to have solid fat indices as determined by AOCS tentative method Cd 10-57 (corrected 1961) within the ranges following:

| Temperature, ° F. | SFI, preferred | SFI, more preferred |
|---|---|---|
| 50 | 68±16 | 68±5 |
| 70 | 56±12 | 56±4 |
| 80 | 40±10 | 40±3 |
| 92 | 12±5 | 12±3 |
| 100 | 4±3 | 4±2 |

As mentioned above, the shortening particles incorporated in the dough according to the present invention function as the conventional roll-in fat to provide a layered effect. Accordingly, while the particles are distributed uniformly throughout the dough, this is accomplished without losing the discrete identity of at least a large proportion of the particles. It is contemplated that a minor amount of the particles will inevitably be smeared into the dough and the layering effect of that fat will be lost. However, this loss is easily minimized or eliminated by refrigeration and/or encapsulation and/or blending with firmer material. In any event, as long as particles are retained in the dough, the layering effect will be achieved to an extent commensurate with their number and size. Thus, where the present specification and claims refer to the distribution of discrete particles of shortening throughout the dough, it is to be understood that a few of the particles, up to about 10%, and a minor proportion of each particle, up to about 10%, may be smeared out into the dough.

The dough is at least substantially developed prior to incorporation and distribution of the particles to avoid smearing out the shortening. However, where well refrigerated, encapsulated or otherwise firm particles are utilized, the likelihood of smearing out is reduced and any extra time utilized to ensure good distribution of the particles throughout the dough can be used to complete development. In any event, the dough is at least substantially fully developed prior to incorporation of the shortening particles and the primary function of subsequent mixing is to distribute the particles in the dough and not to develop the dough.

The dough to which the particles are added is preferably conventional Danish pastry dough and the ingredients thereof are well known in the art. The essential elements of the dough include flour, water, yeast, yeast food, eggs, milk, salt, sugar and shortening. Suitable amounts of these ingredients would be as follows:

| Ingredient: | Amount (p.b.w.) |
|---|---|
| Flour | 100 |
| Water | 44–52 |
| Yeast | 4–10 |
| Yeast food | ½–3 |
| Eggs (whole) | 6–15 |
| Milk (NFDM) | 2–6 |
| Salt | ¾–2¼ |
| Sugar | 10–25 |
| Shortening | 6–15 |

In addition, the dough would ordinarily include a softener, a mold inhibitor, a dough conditioner and a gluten developer.

The total amount of particles added to the dough, which functions as roll-in fat, can vary widely, but 10 to 25% by weight based on the dough weight is appropriate and this is generally less than the amount of roll-in fat used in the conventional manner. Thus it is possible, according to the invention, to use generally less roll-in fat to obtain Danish patry comparable to that obtained by the time consuming conventional manner.

We claim:
1. A method of making Danish pastry dough comprising the steps of:
    (a) providing an at least substantially developed, leavened Danish pastry dough; and
    (b) distributing throughout said developed dough a plurality of solid, discrete particles comprising shortening and having a melting point not greater than about 108° F., and having a size of not greater than 500 mm.³ said shortening particles being employed in an amount sufficient to function as a roll-in-fat whereby Danish pastry can be prepared by merely baking said dough without the necessity of performing any of the rolling and folding operations conventionally utilized in making said pastry.

2. A method according to claim 1 wherein said particles are flakes.

3. A method according to claim 2 wherein said flakes have a thickness of from ¼ to 3 mm.

4. A method according to claim 1 wherein a major proportion of said particles have a size of not greater than about 250 mm.³.

5. A method according to claim 1 wherein said particles consist essentially of shortening having a melting point of less than 108° F.

6. A method according to claim 5 wherein said melting point is between 101 and 104° F.

7. A method according to claim 6 wherein said particles are flakes.

8. A method according to claim 1 wherein said particles comprise a hard shortening and a soft shortening having a melting point of not greater than about 108° F.

9. A method according to claim 1 wherein the total weight of shortening particles incorporated into the dough is from about 10 to 25% of the dough weight.

10. A method of making Danish pastry comprising the steps of providing Danish pastry dough with a plurality of discrete shortening particles distributed therethrough according to the process of claim 1, and baking the dough.

11. A method of making Danish pastry according to claim 10 wherein the dough is cut and shaped to pastry shape prior to baking.

References Cited
UNITED STATES PATENTS 3,255,016   6/1966   Parker _____ 99—94

RAYMOND N. JONES, Primary Examiner